United States Patent
Radmard et al.

(10) Patent No.: US 9,975,314 B1
(45) Date of Patent: May 22, 2018

(54) FIRE RESISTANT COATINGS FOR WOOD VENEER PANELS

(71) Applicant: Chase Corporation, Pittsburgh, PA (US)

(72) Inventors: Bijan Radmard, Norwood, MA (US); Edward R. Poznysz, Canton, MA (US); Jeffrey Adams Sargeant, Cumberland, RI (US); Keith Waryold, Oyster Bay, NY (US); Donald J. Giroux, Wellesley, MA (US)

(73) Assignee: Chase Corporation, Westwood, MA (US)

( * ) Notice: Subject to any disclaimer, the term of this patent is extended or adjusted under 35 U.S.C. 154(b) by 0 days. days.

(21) Appl. No.: 15/692,007

(22) Filed: Aug. 31, 2017

(51) Int. Cl.
| | |
|---|---|
| *B32B 15/095* | (2006.01) |
| *B32B 7/12* | (2006.01) |
| *B32B 15/10* | (2006.01) |
| *B05D 3/06* | (2006.01) |
| *B05D 1/28* | (2006.01) |

(52) U.S. Cl.
CPC .............. *B32B 15/095* (2013.01); *B05D 1/28* (2013.01); *B05D 3/067* (2013.01); *B32B 7/12* (2013.01); *B32B 15/10* (2013.01); *B32B 2307/3065* (2013.01)

(58) Field of Classification Search
CPC ......... B32B 15/095; B32B 7/12; B32B 15/10; B32B 2307/3065; B05D 1/28; B05D 3/067
USPC ....................................... 428/537.1
See application file for complete search history.

(56) References Cited

U.S. PATENT DOCUMENTS

| | | | |
|---|---|---|---|
| 6,228,433 B1 * | 5/2001 | Witt .................... | C09D 4/06 427/487 |
| 2004/0110020 A1 * | 6/2004 | Kjellqvist ............. | B05D 7/06 428/537.1 |
| 2006/0079612 A1 * | 4/2006 | Troutman .............. | C09D 5/185 524/99 |
| 2009/0208663 A1 * | 8/2009 | Winkle .................. | B05D 3/067 427/512 |

* cited by examiner

*Primary Examiner* — Leszek Kiliman
(74) *Attorney, Agent, or Firm* — Fish & Richardson P.C.

(57) ABSTRACT

Methods for treating panels are described that include coating a wood substrate with a polymeric solution, curing the coated wood substrate by subjecting the coated wood to ultraviolet radiation and causing the polymeric solution to crosslink to produce a fire-resistant veneer. Also described is a composite material comprising a wood substrate layer, and a UV-cured flame retardant coating the wood substrate layer, wherein the composite material has a Flame Spread Index values within 0 to 25 and a Smoke Developed Index of 450 or lower.

18 Claims, 6 Drawing Sheets

FIRE RESISTANT COATINGS FOR WOOD VENEER PANELS

TECHNICAL FIELD

This disclosure relates to a fire-resistant coating for wood panels.

BACKGROUND

Residential fires kill more than 2,500 people per year in the United States alone. To minimize the damage and loss of life that occurs during a fire, it is important to build with fire-resistant materials, or materials where it takes longer for fire to affect the material, allowing people and systems to become alerted and to react before the damage is widespread. Materials are thus rated in respect to how long it would take fire to affect their structural abilities.

SUMMARY

The disclosure is based, in part, on techniques for coating wood veneer panels with an ultraviolet (UV) cross-linkable coating to attain a beneficial result of a highly fire resistant panel, one that meets ASTM E84 standard of Class A.

A method for treating panels comprises coating a wood substrate with a polymeric solution, curing the coated wood substrate by subjecting the coated wood to ultraviolet radiation and causing the polymeric solution to crosslink to produce a fire-resistant veneer. In some implementations, the coating is applied by rolling. The method can include adhering a wood substrate to a metallic backing. The cured panel has flammability resistance with a Flame Spread Index values within 0 to 25 and a Smoke Developed Index of 450 or lower. The coating is urethane acrylate. The method can further comprise applying a second coating and curing the second coating by applying UV radiation to the second coating. The second coating is urethane acrylate. The UV radiation has a wavelength of about 365 nm.

In aspects of the invention a composite material comprises a wood substrate layer, and a UV-cured flame retardant coating the wood substrate layer, wherein the composite material has a Flame Spread Index values within 0 to 25 and a Smoke Developed Index of 450 or lower. In some implementations, there is a base layer and an adhesive between the base layer and the wood substrate. The base layer comprises a metal. The adhesive meets Class A flammability standard. The coating comprises urethane acrylate. The coating has a thickness of less than 385 microns. The coating has a thickness of approximately 375 microns. The wood substrate layer comprises one or more of oak, pine, and maple.

Advantages of the coating include that UV polymerization reduces exposure time and polymerization is very rapid. Cycle time is dramatically shortened with UV polymerization so that one coat-cure-and go in a matter of seconds.

Additionally, the methods described herein have the advantage of improving the appearance of wood veneer panels. Traditional wood veneers become distorted because the water in water-based systems affects the appearance of the product. Such distortion makes the product look synthetic and cheap (e.g., not authentic, unlike real wood).

Not only do the existing systems take longer to produce materials with an undesirable look, but the durability of the material degrades due to the length of the processes and the number of passes required, causing the material to weaken over time and not be as durable.

Additionally, because the polymerized top coat provides very good flame resistance, even a very thin layer of wood can be protected. This results in cost savings from reduced wood material costs since less wood is needed to provide good fire protection properties. Thin wood layers are also much easier to work with.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
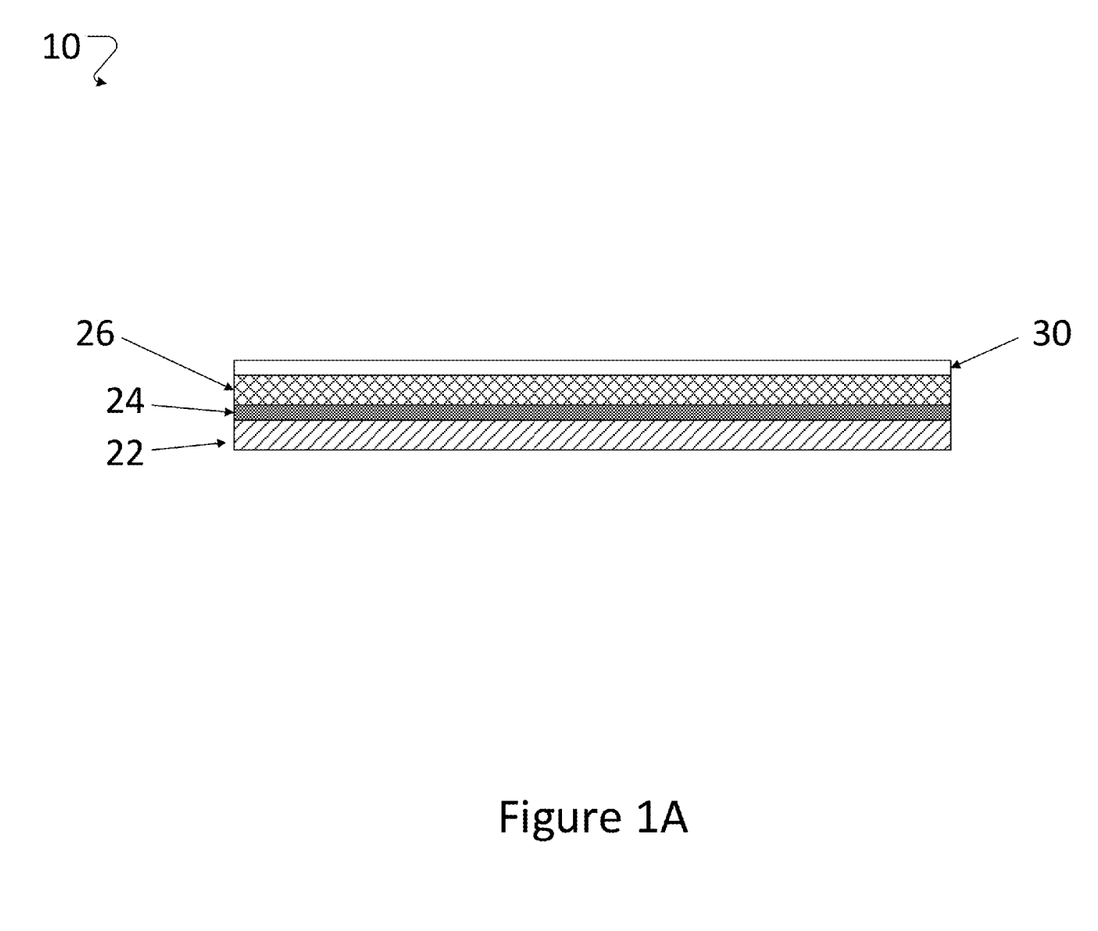
FIG. 1A is a cross section of fire-retardant wood veneer panel.

FIG. 1A shows a fire-retardant wood veneer panel 10. The panel 10 includes an ultraviolet (UV) curable decorative and protective fire-retardant coating for the wood substrate and has a high degree of flammability resistance as well as a pleasing appearance.

The panel 10 is a composite structure made up of several layers. The bottom most layer is the base layer 22, for example, a metallic (e.g., aluminum) backing base layer. The base layer can be approximately 1 mm in thickness. Permanently bonded to the base layer 22 is an adhesive layer 24. The adhesive layer 24 can be about 75 microns in thickness. The adhesive layer 24 connects the base layer 22 to a wood layer 26, or wood substrate or veneer. The adhesive layer 24 can be Class A rated (as described below) adhesive that is commercially available as to not contribute to the flammability of the assembled panel 10, such as 3M™ industrial adhesive 4799. The wood layer 26 is what the user wishes to see when the panel 10 is laid in place, with the grain or wood pattern of the wood layer 26 visible. The wood layer 26 is coated with a fire-retardant top coat 30. In preferred implementations, the fire-retardant top coat 30 is a UV-curable urethane acrylate coating. The UV-curable urethane acrylate coating can undergo crosslinking process upon exposure to UV radiation to solidify the coating. Once crosslinked, or cured, a clear fire-retardant top coat 30 is the result, giving the panel 10 its fire-retardant properties and appealing appearance.

Figure 1B:
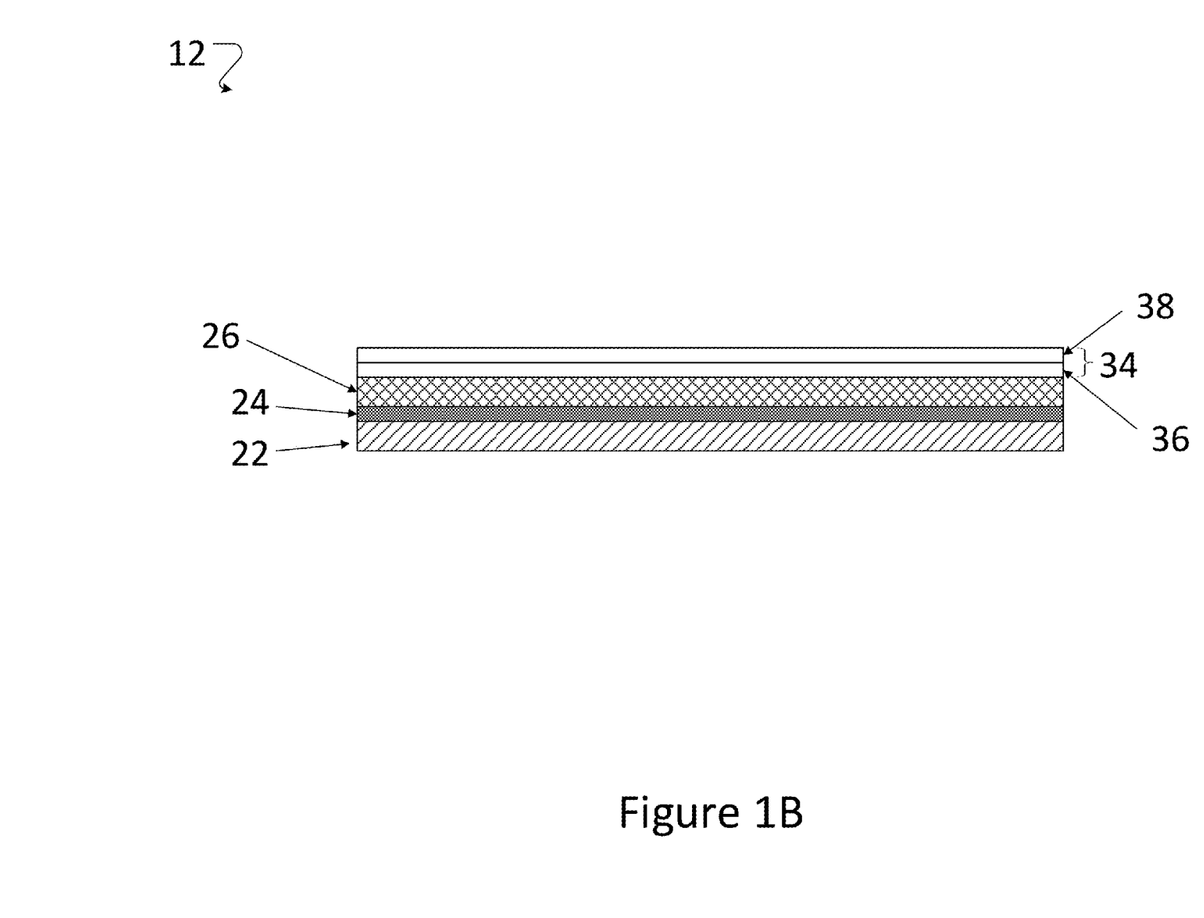
FIG. 1B is a cross section of a second embodiment of a fire-retardant wood veneer panel.

Another embodiment of a fire-retardant wood veneer panel 12 is shown in FIG. 1B. The layers of the panel 12 track the layer of the panel 10 shown in FIG. 1A: the base layer 22, the adhesive layer 24 connecting the base layer 22 to the wood layer 26. However, a fire-retardant top coat 34 is composed of two separate layers, e.g., two layers of separate fire-retardant top coat with a bottom layer 36 and an upper coat layer 38. Each layer 36 and 38 can be the same as layer 30 (of FIG. 1A) or could each be different materials.

Once cured, the two separate fire-retardant layers 36, 38 act as the single layer 34 to increase the protection properties of the panel 12.

The fire-retardant wood veneer panels 10 and 12 meet the American Society for Testing and Materials' Standard Test Method for Surface Burning Characteristics of Building Materials (ASTM E84). ASTM E84 is one of the more frequently specified standard test methods for assessing the surface burning characteristics of building products such a wood panels. The test procedure of ASTM E-84 is comparable to UL723, ANSI/NFPA 255, and UBC No. 8-1. Generally, the purpose of this test is to observe the flame spread along a sample product to determine the relative burning behavior of the material. This test measures a material's reaction after being exposed to fire in terms of flame development and smoke production. These testing standards inform a customer as to if a product has the potential to quickly cause damage when exposed to an ignition source, as opposed to having some moderate ability to withstand ignition so that an attempt at extinguishment may be made. The amount of smoke and flame produced by a material is measured against two controls, a fiber-reinforced cement board which does not burn or smoke, and red oak flooring which represents a high flammability level.

The two categories measured in the test are the Flame Spread Index (FSI) and the Smoke Developed Index (SDI) which state, respectively, how far flames generated on the test material spread and how much smoke is generated. The FSI is measured from 0 (indicating no flames) to 200 (which indicates quickly spreading flames) and measures the speed at which flames progress across the interior surface of a building. SDI is measured on a scale of 0 to 450, from no smoke generated (value 0) to thick, heavy smoke (value 450). FSI and SDI values are compiled and applied to a three-tiered class system: Class A, Class B, and Class C (also known as Class 1, 2 and 3). Class A rated materials produce minimal to no flames or smoke, while Class C produces the most and Class B materials generate a fair amount of both. FSI values must be within 0 to 25 to be classified as Class A, 26 to 75 for Class B and 76 to 200 for Class C. All must also score 450 or lower in SDI.

An ASTM E84 test is conducted by placing a 24-inch wide and 24-feet long sample into a Steiner Tunnel. A Steiner Tunnel is a steel box lined on its sides and floor with fire brick, with a removable lid. The tunnel contains a 12-inch high fire chamber with two burners at one end providing 89 kW of energy. During the test the sample is mounted on the ceiling under the removable lid, and a forced draft is provided for the movement of air and products of combustion within the tunnel, and to an exhaust/scrubber system. The progress of the flame is monitored through viewports on one side of the tunnel and recorded, with software computing the various data points to derive FSI and SDI. Smoke developed is also measured through the optical density of a light obscuration meter.

The panels 10 and 12 of FIGS. 1A and B qualify for the Class A rating, unlike panels produced from prior systems using other coatings that are flame retardant. Such prior systems use materials that are absent a UV curing technique. Additionally, the top coating provided by conventional systems has a negative impact on the cosmetic appearance of the wood as the top coat changes and darkens the color. The fire-retardant top coat 30 can be urethane acrylate and therefore clear, greatly improving the appearance of the final product.

Figure 2A:
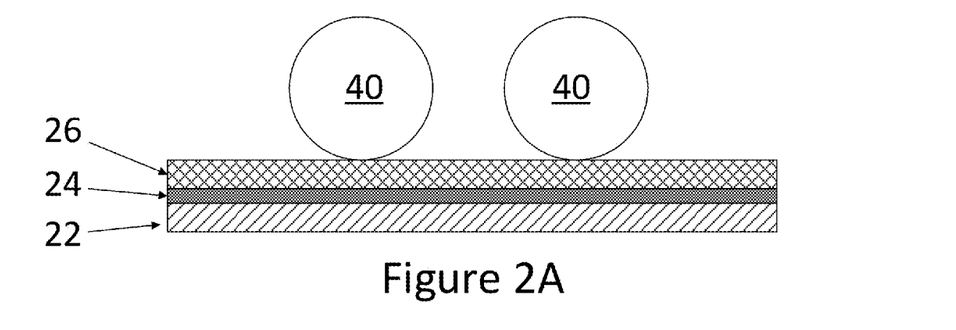
FIGS. 2A-F are schematic drawings describing a technique of manufacturing the fire-retardant wood veneer panels of FIGS. 1A and 1B.
Figure 2B:
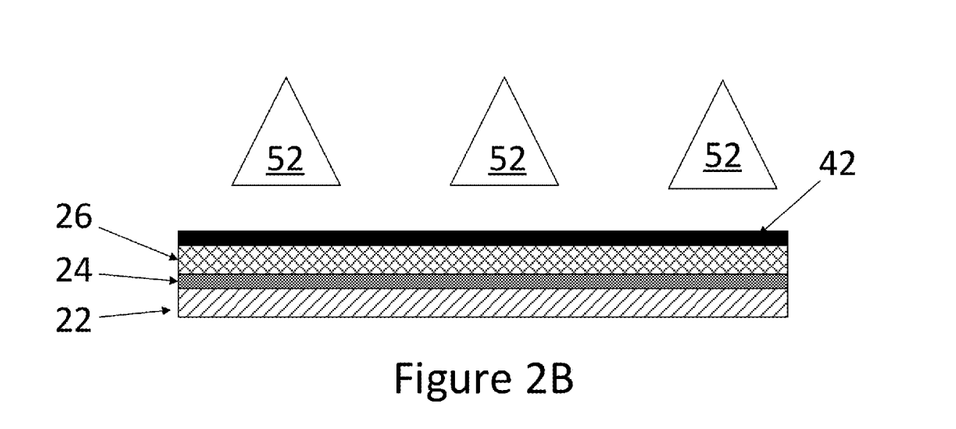
Figure 2C:
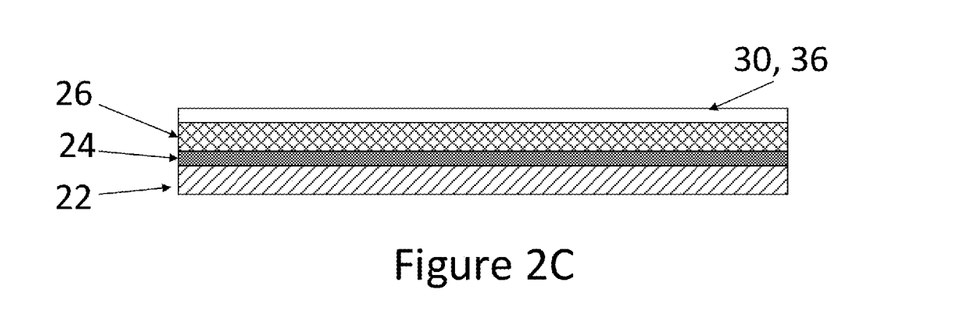

FIGS. 2A-C show one method for manufacturing the panel 10 of FIG. 1A using a roller-based system to apply the fire-retardant top coat 30. In FIG. 2A, liquid coating is applied to a partially-assembled panel (with base layer 22, adhesive layer 24, and wood layer 26) via rollers 40. Typically, the panel is moved past a roller station on a conveyer belt. The speed of rotation of the rollers 40 partially determines the thickness of the liquid coating that gets applied. The partially assembled panel, once past the rollers, has a layer of liquid coating 42 on the wood layer 26. The conveyor brings the panel to the UV curing station where UV sources 52 apply radiation to the liquid coating 42, FIG. 2B. An H type UV bulb with spectrum wavelength between 200 nm and 460 nm can be used (e.g., 365 nm). Once past the UV sources, the liquid coating 42 has cross-linked and hardened into a fire-retardant top coat 30 (or fire-retardant top coat layer 36), which is depicted as a clear layer in FIG. 2C.

The conveyor belt can move at fairly high speeds, e.g., 30 meters per minute. Since the layer of liquid coating 42 is thin, the time required to UV-cure the layer into fire-retardant top coat 30 is relatively short, e.g., completed in matter of a few seconds.

Figure 2D:
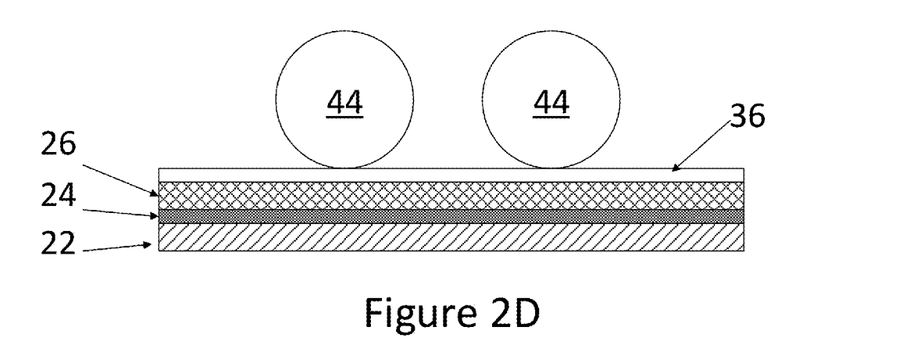
Figure 2E:
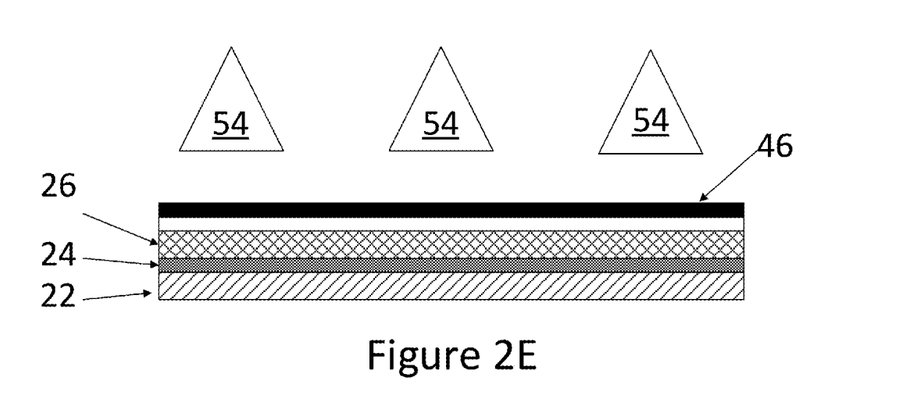
Figure 2F:
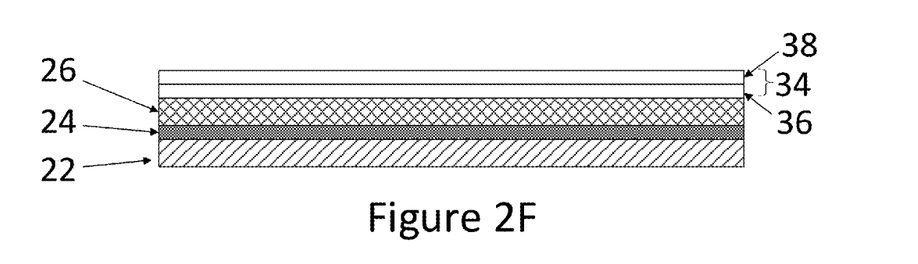

FIGS. 2D-F show steps that follow those of FIGS. 2A-C to generate the panel 12 of FIG. 1B. In FIG. 2D a second set of rollers 44 applies a second layer of the liquid coating 46 (or another type of liquid coating in some instances) on the previously cured fire-retardant coat layer 36. The conveyor brings the panel to a second UV curing station where UV sources 54 apply radiation to the liquid coating 46, FIG. 2E. Once past the UV sources, the liquid coating 42 has cross-linked and hardened into fire-retardant top coat 34 composed of the two fire-retardant top coat layers 36, 38 which is depicted as two clear layers in FIG. 2F.

In some instances, the entire process including the steps of FIGS. 2A-2F, takes 25-30 seconds. In some instances, further processing may be executed, for example, an optional sanding procedure can also be included.

While roller coating can apply the fire-retardant top coat 30, other coating techniques may be employed individually or in concert with roller coating. For example, a spray coating procedure (e.g., atomization) is possible, as is brushing, or other techniques for physically depositing the material on the wood substrate. After any coating is applied by the one or more techniques, the panel would then be exposed to UV radiation to cure the coating material.

The wood layer 26 can be any wood used in building material (e.g., maple, oak, pine, etc.). With the process described herein, flammable wood layers 26 can be made greatly fire resistant due to the fire-retardant top coat 30 that is UV polymerized. The fire-retardant top coat 30 can be a relatively thin layer and still achieve flame resistance, for example be approximately 15 ml (approximately 375 microns, or less than 385 microns) while still achieving Class A rating. The wood layer 26 can also be thin since the fire-retardant top coat 30 provides very good flame resistance such that even very thin layer of wood can be protected. Therefore, cost savings are possible due to reduced wood being necessary than the thicker wood that is typically preferred to improve flame resistance. Thin wood layers 26 are also easier to work with since they do not have problems associated with working with thick wood (e.g., cracking).

In some implementations, the liquid coating is composed of isobornyl acrylate (20-30 wt. %), diphenyl(2,4,6-trimethylbenzoyl)phosphine oxide (1-3 wt. %), dipropylene glycol diacrylate (1-3 wt. %), silica, (1-3 wt. %), Tetrabromobisphenol A (<1 wt. %), and hexamethylene diacrylate (<0.2 wt. %).

Density of the liquid coating in some implementations is approximately 1.05 g/ml (e.g., 1.02 to 1.08), the minimum solids content is 98%, viscosity (per Fed-Std-141, Meth. 4287) is 1100 centipoise (e.g., 850 to 1350), and has a Shore A Hardness of 70. To achieve substantial cross linking density of the liquid coating, the liquid need to be exposed to the appropriate spectral output. Table 1 below outlines the dosages and irradiance range values needed to properly cure the liquid on conveyers at speed of up to 30 m/min. After UV exposure and return to room temperature the coating should be tack-free. These ranges were experimentally established by measuring the dose and irradiance varying the output power level of UV source using a UV Power Puck® radiometer (from WIT Instruments) achieving a tack free coating.

TABLE 1

|     | Dose (J/cm2) | | | | Irradiance (W/cm2) | | | |
| --- | --- | --- | --- | --- | --- | --- | --- | --- |
|     | UV A | UV B | UV C | UV V | UV A | UV B | UV C | UV V |
| Min | 0.700 | 0.700 | 0.150 | 0.750 | 0.700 | 0.700 | 0.150 | 0.700 |
| Max | 3.000 | 3.000 | 0.600 | 3.500 | 1.150 | 1.150 | 0.240 | 1.300 |

Figure 3:
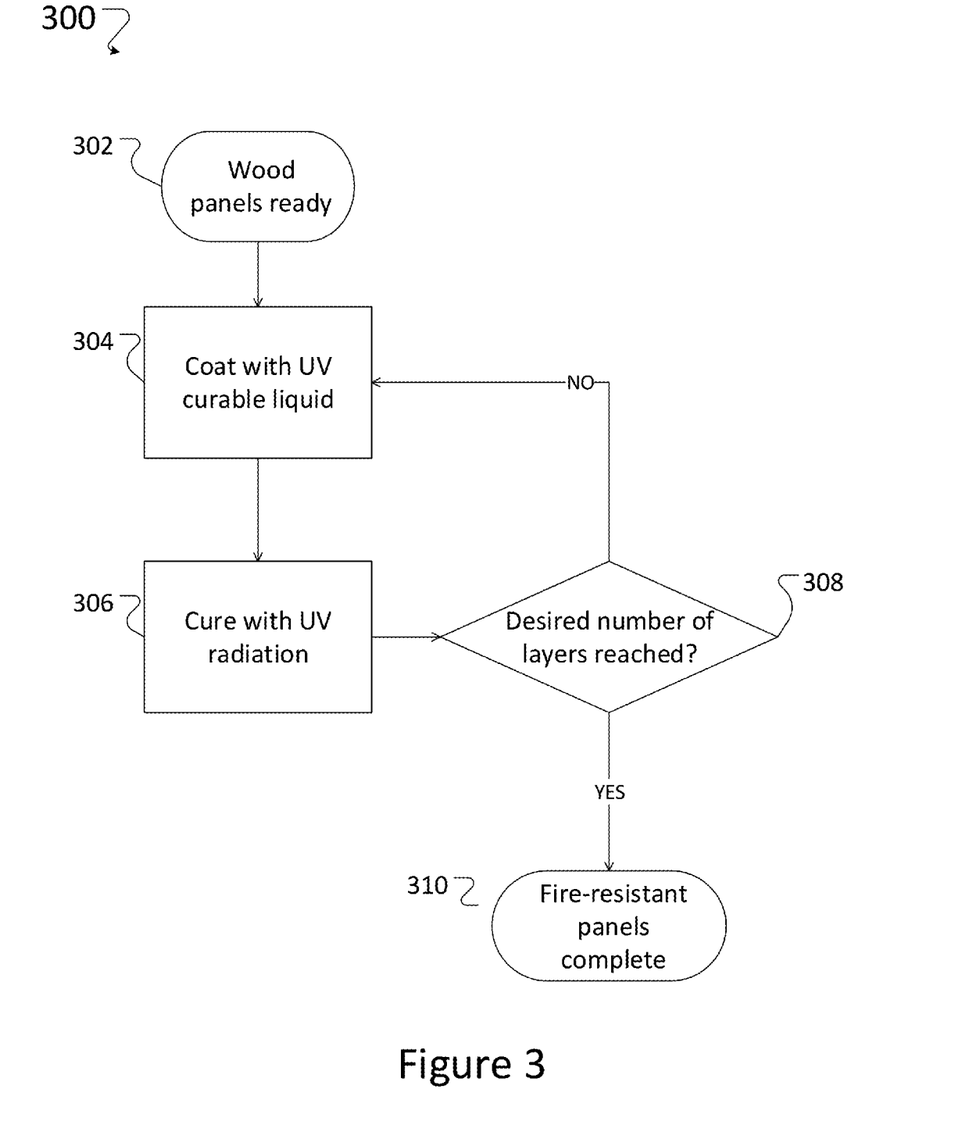
FIG. 3 depicts a flow chart for creating fire-retardant coated panels.

FIG. 3 depicts a flow chart 300 for creating panels covered with a fire-retardant coating. At step 302, the panel is partially-assembled and are ready for top layer coating, e.g., the panels have been loaded on a conveyor belt. The partially-assembled panel is then coated with a liquid (e.g., by rollers) that can be UV-cured into a fire-retardant top coat, step 304. At step 306, the panel with the liquid layer is then UV-cured, resulting in a hardened fire-resistant layer in a matter of seconds. If the desired number of coatings has been applied, step 308, the panels are now complete and ready for use, step 310. If not, the process returns to step 304 and the panel is then returned to have another liquid layer administered on top of the just-cured layer and then the new layer is cured again at step 306. The number of coatings can thus be 1, 2, or 3 or more.

Advantages of the methods and products described herein include that UV polymerization reduces exposure time and polymerization is very rapid. The cycle time is considerably shortened with UV polymerization so that one coat-cure-and go in a matter of seconds.

Additionally, the techniques described herein have the advantage of improved appearance. Traditional wood veneers become distorted because the water in water-based systems affects the appearance of the product. Such distortion makes the product look synthetic and cheap (e.g., not authentic, doesn't look like real wood). The improved appearance is also due to the fire-retardant top coat 30 being a layer, rather than impregnated into the wood substrate. Impregnating the wood substrate with a flame-retardant material can generate has a dull undesirable color.

The techniques described herein not only are faster and more visually appealing, but the durability of the material is longer since minimal degradation occurs due to the length of the processes and the number of passes required, causing the material to not weaken over time and be more durable.

Additionally, because the polymerized top coat provides very good flame resistance, even a very thin layer of wood can be protected. This results in cost savings from reduced wood material costs and ease of manufacture with thin vs. thick wood layers.

EXAMPLES

Figure 4A:
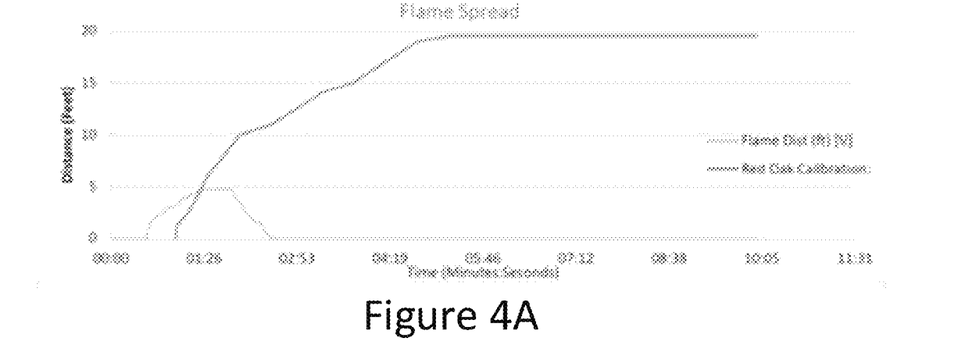
FIG. 4A-C are graphs showing the results of safety testing of the fire-retardant wood veneer panels of FIGS. 1A and 1B.
Figure 4B:
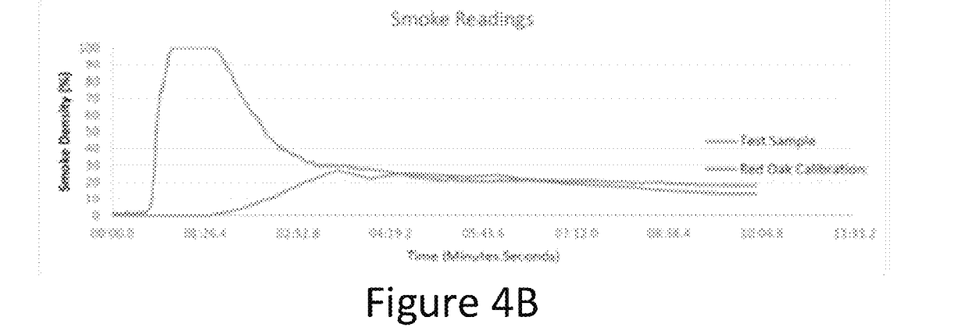
Figure 4C:
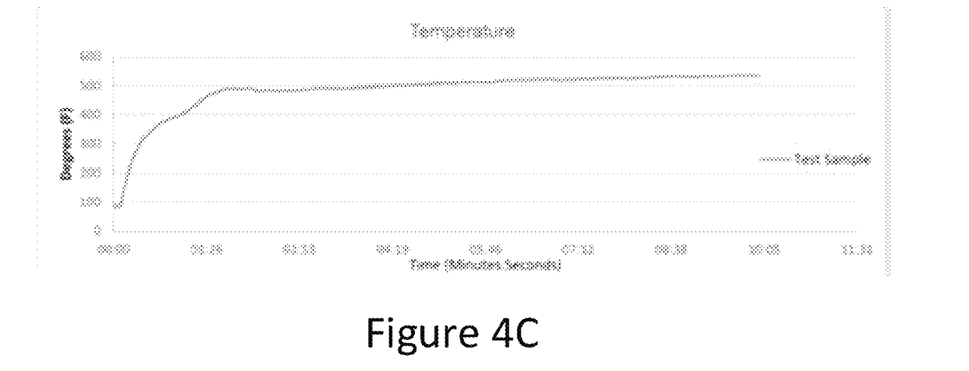

Laboratory testing carried out using the protocols in compliance with international standards testing as described above has shown the fire-resistant properties of the panels. FIG. 4A shows the flame spread data (in distance vs. time) compared to a red oak standard, FIG. 4B the smoke readings (in smoke density vs. time) compared to a read oak standard, and FIG. 4C the temperature results (in degrees Fahrenheit vs. time). The ASTM E-84 testing of veneer substrates coated with class-A rated UV wood coating as described herein yielded FSI of 20 and SDI of 200.

Several embodiments of the invention have been described. Nevertheless, it will be understood that various modifications may be made without departing from the spirit and scope of the invention. For example, although the fire retardant processes described has been for wood substrate (e.g., for building materials in construction space) they could also be used for other substrates in other market areas. For example, these include other industries such as aerospace where sensitivities to combustible/flammable materials are critical. Uses include laminating furniture/cabinets in airplane, from private jets to commercial aircrafts. Accordingly, other embodiments are within the scope of the following claims.

What is claimed is:

1. A method for treating panels comprising:
    coating a wood substrate with a polymeric solution comprising urethane acrylate; and
    curing the coated wood substrate by subjecting the coated wood to a source of ultraviolet radiation and causing the polymeric solution to crosslink to produce a fire-resistant veneer, the ultraviolet radiation comprising a UV A dose between about 0.7 and about 3 J/cm$^2$, a UV B dose between about 0.7 and about 3 J/cm$^2$, a UV A irradiance between about 0.7 and about 1.15 W/cm$^2$ and a UV B irradiance between about 0.7 and about 1.15 W/cm$^2$.

2. The method of claim 1, wherein the coating is applied by rolling.

3. The method of claim 1, comprising adhering the wood substrate to a metallic backing.

4. The method of claim 1, wherein the cured panel has flammability resistance with a Flame Spread Index value within 0 to 25 and a Smoke Developed Index of 450 or lower.

5. The method of claim 1, further comprising applying a second coating and curing the second coating by applying ultraviolet radiation to the second coating.

6. The method of claim 5, wherein the second coating is urethane acrylate.

7. The method of claim 1, wherein the ultraviolet radiation has a wavelength of about 365 nm.

8. A composite material comprising:
    a wood substrate layer; and
    an ultraviolet radiation-cured flame retardant coating the wood substrate layer, wherein the composite material has a Flame Spread Index values within 0 to 25 and a Smoke Developed Index of 450 or lower, and wherein the coating comprises 20-30 weight percent isobornyl acrylate, 1-3 weight percent diphenyl (2,4,6-trimethylbenzoyl) phosphine oxide, 1-3 weight percent dipropylene glycol diacrylate silica, less than 1 weight percent Tetrabromobisphenol A, and less than 0.2 wt. % hexamethylene diacrylate.

9. The composite material of claim 8, further comprising a base layer and an adhesive between the base layer and the wood substrate.

10. The composite material of claim 9, wherein the base layer comprises a metal.

11. The composite material of claim 9, wherein the adhesive meets Class A flammability standard.

12. The composite material of claim 8, wherein the coating comprises urethane acrylate.

13. The composite material of claim 8, wherein the coating has a thickness of less than 385 microns.

14. The composite material of claim 13, wherein the coating has a thickness of approximately 375 microns.

15. The composite material of claim 8, wherein the wood substrate layer comprises one or more of oak, pine, and maple.

16. The method of claim 1, comprising moving the coated wood past the source of ultraviolet radiation at a speed of up to 30 meters per minute.

17. The method of claim 1, wherein the ultraviolet radiation comprises a UV C dose between about 0.15 and about 0.6 J/cm$^2$, a UV V dose between about 0.75 and about 3.5 J/cm$^2$, a UV C irradiance between about 0.15 and about 0.24 W/cm$^2$ and a UV V irradiance between about 0.7 and about 1.3 W/cm$^2$.

18. The composite material of claim 8, wherein the coating has a density between approximately 1.02 to 1.08 g/ml and a viscosity of approximately 1100 centipoise.

\* \* \* \* \*